United States Patent [19]

Patterson

[11] E Re. 29,309

[45] Reissued July 19, 1977

[54] TRACTION ARRANGEMENT FOR ANGULARLY ROTATABLE SWEEP AUGER OF CIRCULATOR GRAIN BINS

[76] Inventor: William C. Patterson, 9364 North 45th St., Omaha, Nebr. 68112

[21] Appl. No.: 671,250

[22] Filed: Mar. 29, 1976

Related U.S. Patent Documents

Reissue of:

[64] Patent No.: 3,800,964
Issued: Apr. 2, 1974
Appl. No.: 329,303
Filed: Feb. 5, 1973

[51] Int. Cl.[2] ..... B65G 65/46
[52] U.S. Cl. ..... 214/17 DA
[58] Field of Search ..... 214/17 DA

[56] References Cited

U.S. PATENT DOCUMENTS

| | | | |
|---|---|---|---|
| 3,414,142 | 12/1968 | Kolze | 214/17 DA X |
| 3,563,399 | 2/1971 | Shivers | 214/17 DA X |

*Primary Examiner*—Robert G. Sheridan

*Attorney, Agent, or Firm*—Zarley, McKee, Thomte, Voorhees & Sease

[57] ABSTRACT

Circulator grain bins commonly comprise upright sidewall means customarily circularly surrounding the bin vertical-axis and also a substantially horizontal floor for supporting a lofty depth of grain thereupon; there is a substantially horizontal elongate sweep auger located immediately above the floor and henced submerged at the bottom of the grain pile, the sweep auger radiating lengthily outwardly from and angularly rotatable about the bin vertical-axis. Each of at least two consecutive medial helical flights for the sweep auger is provided with separate distinct cogs extending radially externally from the flighting helical edge whereby said arrayed distinct cogs at their curved free-edges define a segmented spiroid *wheel* rim submerged within the grain. A substantially horizontal annular roadway located along the bin floor between the bin sidewall and vertical-axis abuttably underlies the submerged spiroid rim whereby angular rotation of the axially revolving sweep auger is enhanced and improved to an unusually reliable condition.

10 Claims, 8 Drawing Figures

TRACTION ARRANGEMENT FOR ANGULARLY ROTATABLE SWEEP AUGER OF CIRCULATOR GRAIN BINS

Matter enclosed in heavy brackets [ ] appears in the original patent but forms no part of this reissue specification; matter printed in italics indicates the additions made by reissue.

Circulator grain bins basically comprise an upright lofty sidewall means customarily circularly surrounding the bin upright vertical-axis and also a substantially horizontal floor for supporting bulk grain piled loftily thereupon. Such circular grain bins also basically comprise an axially revolvable elongate sweep auger located immediately above and along the bin floor and hence necessarily submerged at the bottom of the grain storage pile, the sweep auger radiating axially lengthily outwardly from and angularly rotatable about its own elongate auger-axis, and assuming that there are appropriate means to cause the sweep auger to coincidentally angularly rotate about the bin vertical-axis, the lowermost horizontal stratum of the entire grain pile is helically fed or "swept" by the sweep auger toward its inward end, i.e., along the bin floor toward the bin vertical-axis. Grain bins utilizing a helical sweep auger or equivalent means for feeding the grain bottom strata toward the bin vertical-axis are sometimes generically referred to as "circulator grain bins." From the sweep auger inward end, and depending upon whatever specific type of grain conveyance mechanism is employed thereat, the "circulator grain bin" might have additional means for further conveyance of the bottom horizontal grain strata. For example, the bottom strata might be repeatedly re-conveyed or re-cycled within the same bin (such as within grain dryers, etc.), or conveyed to neighboring bins or other grain repositories, e.g., so-called grain transferring operations.

Circulator grain bins of larger circular diameters are becoming more popular for economic or other reasons, which larger bins accordingly require more lengthy rotatable sweep augers. However, with more elongated lengths for the sweep augers, serious problems can arise. The primary problem stems from difficulties encountered in angularly rotating the not only lengthier, but also heavier, sweep augers about the bin vertical-axis. The helical sweep auger, which is revolvable about its own auger-axis to helically feed grain therealong, is traditionally supported above the bin floor at the auger inward and outward ends only, in an effort to not obstruct grain flow inwardly along the sweep auger (toward the bin vertical-axis). Angular rotation is customarily effected through a suitable drive mechanism which is powerably connected and confined to the sweep auger inward end. Isolating the auger drive mechanism near the bin vertical-axis has certain engineering advantages, but there are problems in supplying sufficient torque thereat to make the sweep auger steadily angularly rotate about the bin vertical-axis. Especially difficult is the task of powering the sweep auger for angular rotation when there is no provision for a so-called "vertical auger" grain conveyance mechanism extending along the bin vertical-axis and in meshing engagement with the sweep auger inward end. Such meshing "vertical auger" conveyors, though very helpful in applying torque to help powerably rotate the sweep auger, are not always designed into the "circulating grain bin" installation.

It is accordingly the general object of the present invention to provide for angularly rotatable sweep augers of circulator grain bins reasonable assurance in the form of improved traction arrangement that the sweep auger will be made to smoothly and steadily angularly rotate about the bin vertical-axis as it is being revolved about its auger-axis. It is an ancillary general object to provide a traction arrangement or mechanism that reasonably ensures that the axially revolvable helical sweep auger will also continuously angularly rotate about the bin vertical-axis and without impedance to grain flow axially therealong.

It is another object to provide an improved traction mechanism arrangement for angularly rotatable sweep augers that is adaptable for use in conjunction with various styles and sizes of floored "circulator grain bins" including those having various grain conveyance means communicating with the sweep auger.

It is a further object to provide a traction arrangement or mechanism for angularly rotatable sweep augers that is of economical installation, maintenance, and repair, and that is exceedingly reliable in operation for the intended purposes.

With the above and other objects and advantages in view, which will become more apparent as this description proceeds, the improved traction arrangement or mechanism for rotatable sweep augers generally comprises the provision of a plurality of separate distinct cogs extending radially externally from the helical edge on consecutive medial flight pitches of the sweep auger to provide a segmented spiroid *wheel* rim therefor and submerged within the grain, together with a substantially horizontal roadway extending annularly along the bin floor between the sidewall and the vertical-axis and abuttably underlying the spiroid segmented medial rim support for the auger, whereby traction between the *wheel* rim and roadway at the flowing grain interface is achieved and angular rotatability is enhanced.

In the drawing, wherein like characters refer to like parts in the several views, and in which.

Figure 1:
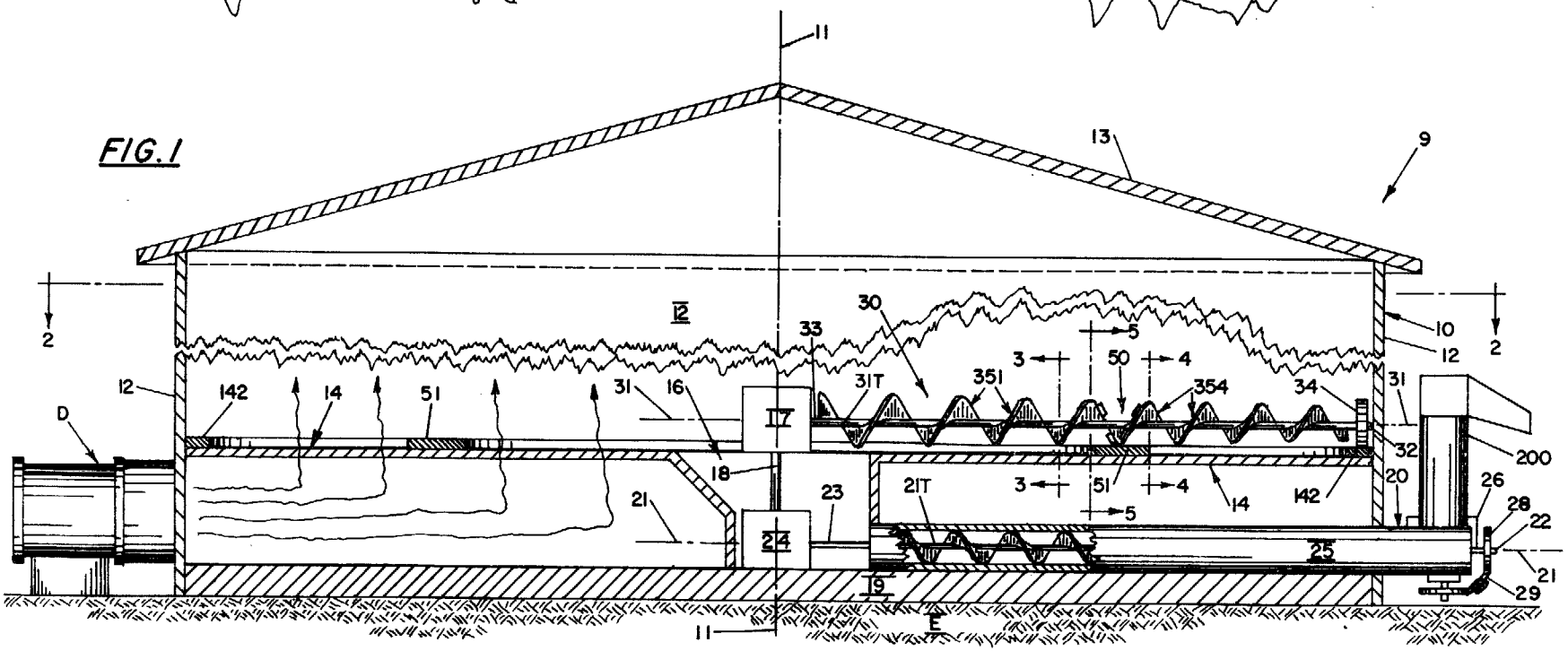
FIG. 1 is a sectional elevational view of a representative embodiment of circulator grain bin having an angular rotatable sweep auger, the improved sweeper auger traction means arrangement of the present invention being indicated as "50".
Figure 2:
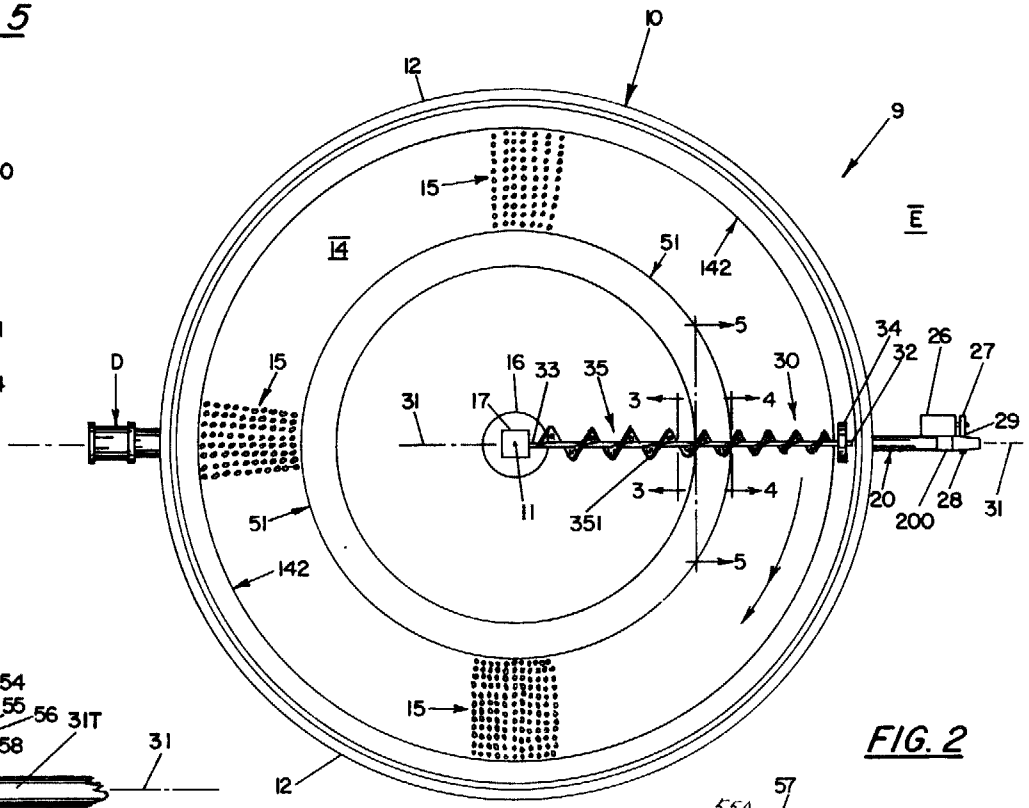
FIG. 2 is a sectional plan view taken along line 2—2 of FIG. 1 showing the entire circular sidewall for the grain bin and the sweep auger medially located improved traction means "50".
Figure 5A:
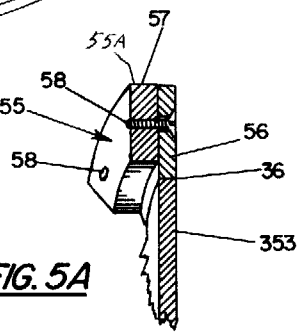
Figure 5:
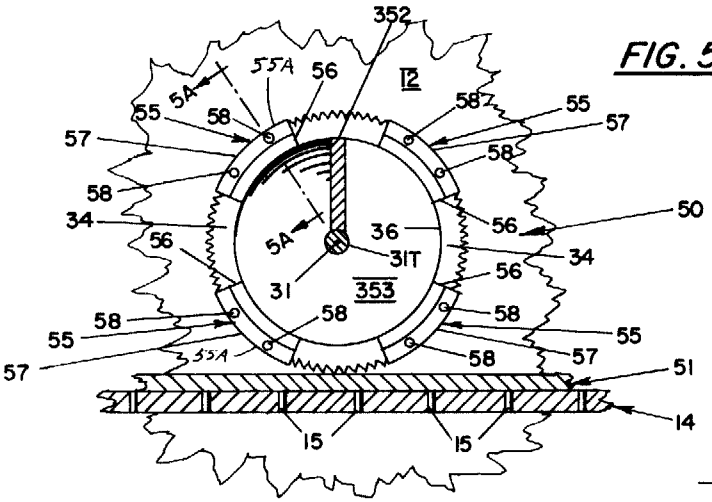

FIG. 5 is a sectional elevational view taken along lines 5—5 of FIGS. 1 and 2, and between sectional lines 3—3 and 4—4, to show the sweep auger traction means.

Figure 6:
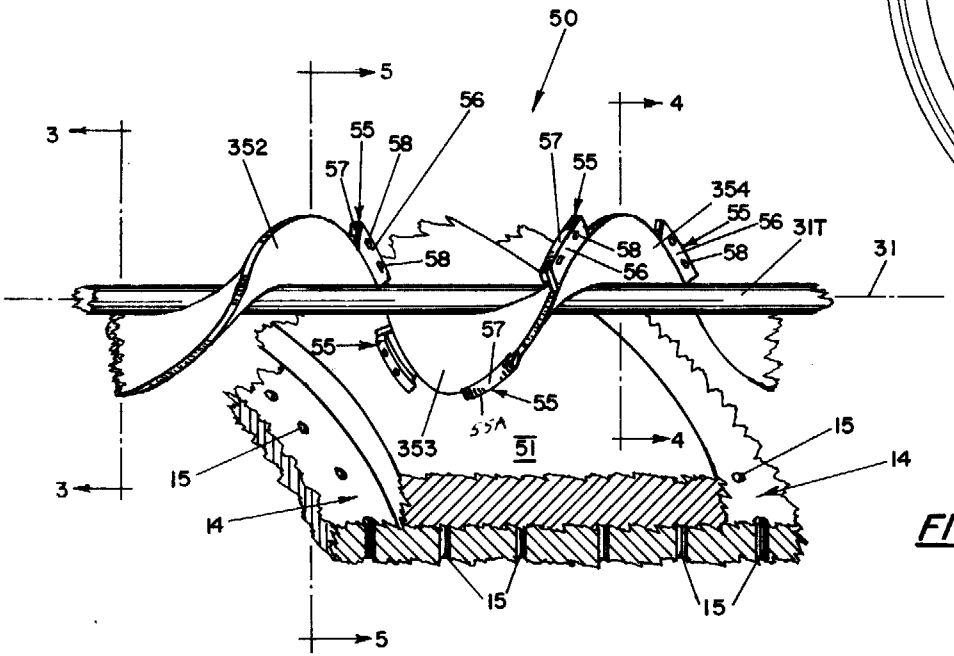

FIG. 6 is a detail perspective view of FIG. 5 to show the said cogged spiroid *wheel* rim for the sweep auger medial portion.

Turning initially to FIGS. 1 and 2 which depict an embodiment 9 circulator grain bin (having sweep auger 30) as a representative (though non-limiting) environment for the sweep auger traction arrangement, e.g., 50, of the present invention. The storage bin portion 10 of embodiment 9 includes upright lofty sidewall means surrounding the bin upright vertical-axis 11, the sidewall means herein employed being a circularly tubular sidewall 12. The roof 13 employed herein of the bin 10 is of the conventional conical shape. There is a substantially horizontal bin floor 14 spaced above the bin foundation 19 which rests upon the earth "E". Bin floor 14, against which the lofty piled grain (not shown) rests, is multi-perforate as indicated at 15 and circularly terminates at sidewall 12. Thus, a vigorous stream of atmospheric or heated air, emerging from heating duct "D" below bin floor 14, can be upwardly ventilated through floor perforations 15 and thence through the loftily stored grain to alter the moisture content thereof. Bin floor 14 is also provided with a comparatively large central opening 16 (at vertical-axis 11), which floor opening 16 cooperates with the grain conveyance mechanism, e.g., 20.

By definition, circulator grain bins, e.g. 9, also necessarily comprise a substantially horizontal sweep auger (e.g., 30 having elongate auger-axis 31) located immediately above the bin floor 14 and hence the helical sweep auger is necessarily submerged at the bottom of the grain storage pile. Horizontal sweep augers 30 radiate axially lengthily from and are also angularly rotatable about the bin vertical-axis 11, sweep augers also being rovolvable about the elongate auger-axis 31. Thus, whenever the elongate sweep auger is made to both revolve about its own auger-axis 31 and to also angularly rotate about the bin vertical-axis 11, the lowermost horizontal stratum of the entire grain pile is helically fed or "swept" by the sweep auger toward its inward end 33, i.e., along the bin floor 14 toward bin vertical-axis 11. Helical flighting 35 of several continuous pitches are attached to the sweep augar axial shaft 31T, the helical flighting serving to inwardly sweep the lowermost grain stratum. As is readily apparent from the FIG. 2 plan view, the grain flow rate appropriately progressively increases toward the bin vertical-axis 11, the prior art having met this requirement in several ways, such as progressively increasing the diameter or reducing the pitch of the helical flighting, etc. In the arbitrarily selected sweep auger 30, the diameter of helical flighting 35 progressively increases toward its inward end 33. From the sweep auger inward end 33, the lowermost horizontal grain strata is re-conveyed or recycled depending upon whatever specific type of grain conveyance is employed.

For circulator grain bin representative embodiment 10, the grain conveyance mechanism selected therefor is a substantially horizontal elongate helical unloader auger 20, which typically also affords the means for causing the sweep auger 30 to revolve about its auger-axis 31 and to also angularly rotate about the bin vertical-axis. Unloader auger 20, having external tubular shell 25, is mounted on foundation 19 beneath the bin floor 14 and operable herein to convey grain radially outwardly from bin floor central opening 16 exteriorly of the bin. The unloader auger embodiment 20 comprises a central shaft 21T extending longitudinally along its unloader-axis 21. Auger shaft 21T radiates from (but does not angularly rotate about) bin vertical-axis 11, said shaft 21T however being revolvable about its own unloader-axis 21. Thus, grain strata falling downwardly of floor opening 16 can be conveyed exteriorly of bin 10, such as with auxiliary grain conveyor 200 tiltably associated with unloader 20 at 22. The outer end of shaft 21T might be provided with a pulley 28 and the outer end of tubular shell 25 might be provided with a motor 26 (having pulley 27), pulleys 27 and 28 being actuatably connected with annular belt 29 to effect revolving of shaft 21T about unloader-axis 21. As is well known in the prior art, the inward end 23 of unloader auger shaft 21T might carry a bevel gear (not shown) located within a gear housing 24 stationarily mounted to foundation 19, and the sweep auger inward end 33 might similarly carry a bevel gear (now shown) located within a gear housing 17 conventionally rotatably carried by a drive shaft 18 vertically extending along vertical-axis 11 between gear housings 17 and 24. The upper (within 17) and lower (within 24) ends of vertical driving shaft 18 might be conventional bevel gears whereby powerably revolvable auger shaft 21T (through 24) revolves driving shaft 18 which in turn (through 17) revolves sweep auger 30 about auger-axis 31.

The revolvable sweep auger 30 typically comprises an auger shaft 31T extending longitudinally along its auger-axis 31 and hence radiating outwardly from bin vertical-axis 11 and rotatable gear housing 17. The revolvable sweep auger 30 needs also to be provided with a capability for concurrently angularly rotating about the bin vertical-axis, this being customarily effected with a suitable traction means between the sweep auger and the bin floor 14. In this vein, prior art workers have employed the simple expedient of attaching a co-revolvable circular wheel 34 to the outward end 32 of shaft 31T. The circular periphery of wheel 34 is notched or otherwise threaded and rests either directly upon bin floor 14 or upon a horizontal annular wear plate 142 carried by floor 14 along the entire circular sidewall 12. Wheel 34 is of just sufficient diameter to maintain the entire helical flighting 35 away from bin floor 14. Thus, as sweep auger shaft 31T and wheel 34 (both submerged in the grain pile) co-revolve about auger-axis 31, the grain-submerged wheel 34 exerts a tractive effort which allows wheel 34 to travel annularly along said wear plate. Inasmuch as traction wheel 34 and auger shaft 31T are co-revolvable, the entire sweep auger 30 is caused to also angularly rotate about driving shaft 18 which lies along bin vertical-axis 11. Accordingly, for every 360° angular rotation of sweep auger 30 about vertical-axis 11, the entire lowermost stratum of the herein cross-sectionally circular lofty grain pile is helically fed inwardly toward vertical-axis 11 and herein downwardly through bin floor central opening 16 for further conveyance, as by unloader auger 20.

The preceeding description has been devoted to circulator grain bins generally of the prior art and including a representative (though non-limiting) embodiment 9 thereof. More recently, circulator grain bins of larger circular diameter (e.g., 12) have become prevalent for economic and other reasons, which larger bins accordingly require more lengthy sweep augers 30. However, with more elongated lengths (and accordingly weightier) sweep augers, serious problems can arise. Prior art workers have long recognized the difficulty in making the elongate weighty sweep auger angularly rotate about the bin vertical-axis 11, while initiating the sweep auger powering from its inward end 33 only. Although such inward powering for auger revolvability has several engineering and economic advantages, its ability to also angular rotate about the bin vertical-axis is to a very large measure dependent upon the revolving sweep auger's underlying traction, e.g., the grain-submerged co-revolvable wheel 34 with floor 14, plate 142, etc. Rotational forces for sweep augers have heretofore been restricted and confined to the inward end 33 and to the outward end (e.g., 12, 32, 142) of the sweep auger shaft 31T, it having been accepted axiomatically by prior art workers (and adhered to herein) that attaching a traction wheel (e.g., 34) to the helically flighted 35 medial major length of shaft 31T would obviously impede grain flow therealong. Because grain flow impedance along the sweep auger helical flighting 35 is to be avoided, the sweep auger traction means has heretofore been traditionally confined to one of the two ends (32 or 33) thereof, and usually primarily to the outward end as with a co-revolvable wheel 34. However, with the increasing popularity of larger diameter bins and the accordingly lengthier and heavier sweep augers, it becomes increasingly difficult for the revolvable sweep auger to also angular rotate about the bin vertical-axis when the sweep auger traction means is relegated or confined only to the two auger ends. Especially pronounced is this difficulty when the grain conveyance mechanism is of type to exert only moderate torque upon the sweep auger inward end 33, as is the case with the conventionally utilized sub-floor unloader auger 20.

Figure 4:
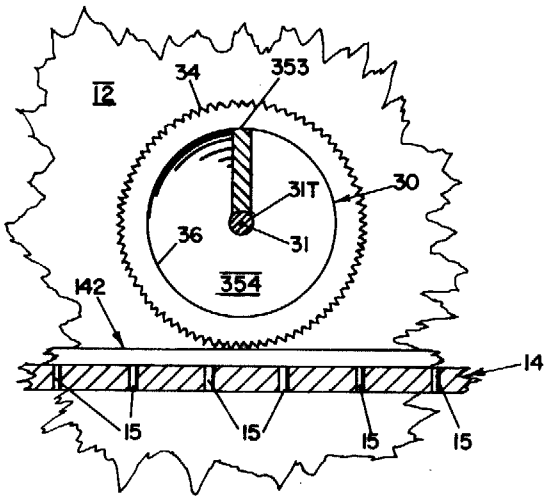
FIG. 4 is a sectional elevational view taken along lines 4—4 of FIGS. 1 and 2.
Figure 3:
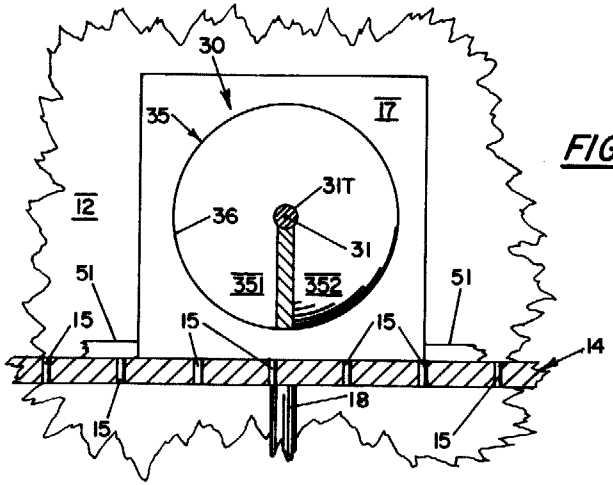
FIG. 3 is a sectional elevational view taken along lines 3—3 of FIGS. 1 and 2.

With the improved underlying *support wheel* traction means, e.g., 50, of the present invention, which need not be confined or relegated to the two ends of the sweep auger, tractive effort and hence angular rotation for the sweep auger is greatly enhanced. In fact, as alluded to in the oppositely peering sectional elevation views of FIGS. 3 and 4, the *support wheel* traction means improvement (e.g. embodiment 50) is preferably positioned substantially intermediate the sweep auger ends (32 and 33) and isolated at consecutive medial pitches (353 and 354) of the sweep auger helical flighting 35. FIGS. 3 and 4 show the unmodified conventional auger helical pitches 351 and 354, respectively. As will now be explained in FIGS. 5 and 6, the improved *support wheel* traction means 50 for sweep auger 30 comprises a plurality of separate distinct cogs 55 extending radially externally from the helical edges 36 of the consecutive medial pitches 352 and 353 of helical flighting 35 to provide a segmented spiroid medial rim 55 for the sweep auger. The segmented spiroid rim 55, submerged within the grain pile, firmly abuts a substantially horizontal annularly roadway 51 that rests upon bin floor 14 and in completely surrounding relationship to bin vertical-axis 61. Thus, annular roadway 51 is analagous to annular wear plate 142, but has a much less diameter, depending upon whichever medial pitches of the sweep auger are provided with the segmented cogs array spiroid rim 55.

For each selected pitch of the sweep auger helical flighting 35, the outer edge 36 thereof is spaced an intra-pitch given mean-radius (which is a substantially constant distance) from the auger-axis 31. There is a plurality of cogs 55 attached to at least two consecutive medial pitches (e.g., parent pitches 352 and 353) and including a cogs plurality attached to one of said parent medial pitches, herein to helical pitch 352. Each cog 55 extends radially externally from its parent flight helical edge 36 whereby the free-edge 55A of each intra-pitch cog is located a finite cog-radius from said edge 36 which is itself spaced an intra-pitch given mean-radius from auger-axis 31. Accordingly, the free-edge 55A of each intra-pitch cog 55 is spaced the sum of mean-radius and cog-radius from auger-axis 31. Moreover, the several distinctly separated cogs 55 provide a segmented medial *wheel* rim for the sweep auger, the array of separated free-edges 55A providing a generally spiroid outer contour that abuttably rests upon annular roadway 51. Assuming that grain or other flowable particulate solids is loftily piled upon bin floor 14 so as to provide a surrounding flowable matrix for sweep auger 30 including spiroid rim 55, and also assuming that auger 30 is made to revolve about auger-axis 31. Thus, the spiroid rim 55 abutting annular roadway 51 helps to maintain the auger-axis 31 in horizontal linearity and also churns through the flowable solids matrix, the cog-radius lead-face of each cog impinging against said grain matrix providing traction sufficient to enhance angular rotation of sweep auger 30. Yet this segmented cogs array, being located radially external to the helical flighting outer edge 36, does not impede solids flow along auger-axis 31 toward bin vertical-axis 11.

As best seen in FIG. 5, the free-edge 55A of each cog is preferably curved and spaced a substantially constant cog-radius externally from the parent pitch helical edge 36. Moreover, the cogs attached to any one parent medial pitch of the sweep auger helical flighting 35 are preferably of identical size and shape and spaced at regular increments along helical edge 36. Cross-sectionally, the several intra-pitch cogs occupy within the range of one-fourth to three-fourths the parent flight edge 36, and preferably within the range of one-third to two-thirds, said ratios permitting optimum traction within the flowable solids matrix without impeding solids flow parallel to auger-axis 31. In this vein, no more than four (and preferably only two) medial pitches of flighting 35 are provided with cogs, the width of underlying roadway 51 being substantially equal to the longitudinal zone of the consecutive cogged pitches. Preferably, each separage cog 55 comprises a mounting-bracket 56 and a lug 57, the mounting-bracket 56 being welded or otherwise rigidly attached to its parent pitch edge 36. The lug 57, which provides cog free-end 55A, is removably attached to mounting-bracket 56, as with screws 58 located radially remote of edge 36. This facilitates replacement of worn individual cogs during long term usage of the segmented array of cogs, i.e., the sweet auger medial spiroid rim traction means.

FIG. 5A, which is taken along line 5A—5A of FIG. 5 and passing through auger-axis 31, aptly shows the cog-radius, the attachment of the mounting-bracket 56 to the parent pitch helical edge 36, and the removable attachment of lug 57 to mounting-bracket 56 with screws 58.

From the foregoing, the construction and operation of the traction arrangement mechanism for rotatable sweep augers will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling with the scope of the appended claims.

I claim:

1. In a circulator type bin for storing grain or other flowable particulate solids and including upright sidewall means surrounding an upright vertical-axis and also a substantially horizontal bin floor intersecting said vertical-axis, said storage bin also including an elongate sweep auger that axially extends along a substantially horizontal auger-axis that radiates outwardly from the bin vertical-axis and is located immediately above the bin floor, said outwardly radiating sweep auger commencing at an inward end being pivotably associated with the bin so that the sweep auger including its outward end is adapted to rotate angularly about the bin vertical-axis, said sweep auger at pitch spacings along the auger-axis comprising helical flighting having a helical external edge spaced an intra-pitch given mean-radius from the auger-axis, the plurality of helical flighting pitches including an innermost pitch, an outermost pitch, and at least four consecutive medial pitches, the elongate sweep auger being revolvable about its auger-axis whereby particulate solids stored atop the bin floor are adapted to be circulated by the auger helical flighting inwardly toward the bin vertical-axis, the improvement of traction mechanism arrangement for the sweep auger and comprising:

A. A plurality of cogs attached to at least two consecutive medial pitches of the sweep auger helical flighting and including a plurality of cogs attached to one of said medial pitches, respective cogs having a free-edge located radially externally from the helical edge a finite cog-radius, said arrayed distinctly separated cogs at their free-edges array defining a medial rim of generally spiroid segmented contour and submergible within the stored flowable particulate solids; and B. A substantially horizontal annular roadway surrounding the bin vertical-axis and abuttably underlying the spiroid cogs array medial rim whereby the axially revolvable and angularly rotatable sweep auger is stably supported above the bin floor thereby assuring that a finite spatial gap exists between the bin floor and the cog-free medial flights of the sweep auger and also providing traction as the revolving distinct cogs churn through said flowable solids matrix environment.

2. The traction mechanism arrangement of claim 1 wherein the cogs attached to any one medial pitch of the sweep auger helical flighting cross-sectionally occupy within the range of one-fourth to three-fourths the external helical edge of its parent medial pitch whereby the cogs do not impede grain flow axially along the revolving sweep auger.

3. The traction mechanism of claim 2 wherein the cogs occupy within the range of about one-third to two-thirds the helical external edge of the parent medial pitch.

4. The traction mechanism of claim 3 wherein the cogs are of like size and shape and spaced at regular increments along the parent pitch helical external edge, each cog being provided with a curved free-edge located said cog-radius from the parent pitch external edge.

5. The traction mechanism of claim 4 wherein only two consecutive medial pitches of the sweep auger helical flighting are provided with said separated cogs.

6. The traction mechanism arrangement of claim 1 wherein each cog comprises a mounting-bracket and a lug, the mounting-bracket being welded to its parent flighting pitch at the helical edge thereof and the lug being removably attached to the mounting-bracket remote of said flighting helical edge to facilitate replacement of worn cogs to ensure long-term use of the spiroid medial rim traction means.

7. The traction mechanism of claim 6 wherein the cogs are of like size and shape and spaced at regular increments along the parent pitch helical external edge, each cog being provided with a curved free-edge located said cog-radius from the parent pitch external edge having said mean-radius.

8. The traction mechanism arrangement of claim 1 wherein the substantially horizontal annular roadway is substantially circular and has a width comparable to about two medial pitches of the sweep auger helical flighting.

*9. In a circulator type bin for storing grain or other flowable particulate solids and including upright sidewall means surrounding an upright vertical-axis and also a substantially horizontal bin floor intersecting said vertical-axis, said storage bin also including an elongate sweep auger that axially extends along a substantially horizontal auger-axis that radiates outwardly from the bin vertical-axis and is located immediately above the bin floor, said outwardly radiating sweep auger commencing at an inward end being pivotably associated with the bin so that the sweep auger including its outward end is adapted to rotate angularly about the bin vertical-axis, said sweep auger at pitch spacings along the auger-axis comprising helical flighting having a helical external edge spaced an intra-pitch given mean-radius from the auger-axis, the plurality of helical flighting pitches including an innermost pitch, an outermost pitch, and at least four consecutive medial pitches, the elongate sweep auger being revolvable about its auger-axis whereby particulate solids stored atop the bin floor are adapted to be circulated by the auger helical flighting inwardly toward the bin vertical-axis, the improvement of traction mechanism arrangement for the sweep auger and comprising:*

*A. A cog attached to a medial pitch of the sweep auger helical flighting, said cog having a free-edge located radially externally from the helical edge a finite cog-radius, said cog at its free-edge defining a medial rim of generally spiroid contour and submergible within the stored flowable particulate solids; and*

*B. A substantially horizontal annular roadway surrounding the bin vertical-axis and abuttably underlying the spiroid cog array medial rim whereby the axially revolvable and angularly rotatable sweep auger is stably supported above the bin floor thereby assuring that a finite spatial gap exists between the bin floor and the cog-free medial flights of the sweep auger and also providing traction as the revolving distinct cog churns through said flowable solids matrix environment.*

*10. In a circulator type bin for storing grain or other flowable particulate solids and including upright sidewall means surrounding an upright vertical-axis and also a substantially horizontal bin floor intersecting said vertical-axis, said storage bin also including an elongated sweep auger that axially extends along a substantially horizontal auger-axis that radiates outwardly from the bin vertical-axis and is located immediately above the bin floor, said outwardly radiating sweep auger commencing at an inward end being pivotably associated with the bin so that the sweep auger including its outward end is adapted to rotate augularly about the bin vertical-axis, said sweep auger having helical flighting along its substantial length the elongated sweep auger being revolvable about its auger-axis whereby particulate solids stored atop the bin floor are adapted to be circulated by the auger helical flighting inwardly toward the bin vertical-axis, the improvement of traction mechanism arrangement for the sweep auger and comprising:*

*A. An auger support wheel on said sweep auger intermediate its inner and outer ends having an effective diameter which is larger than said sweep auger flighting and said support wheel being sufficiently axially open for flowable particulate solids to be conveyed therethrough by said sweep auger flighting; and*

*B. A substantially horizontal annular roadway surrounding the bin vertical-axis and abuttably underlying said auger support wheel whereby the axially revolvable and angularly rotatable sweep auger is stably supported above the bin floor thereby assuring that a finite spatial gap exists between the bin floor and the flighting of the sweep auger and also providing traction as the revolving support wheel churns through said flowable solids matrix environment.*

* * * * *